United States Patent
You et al.

(10) Patent No.: US 7,551,639 B2
(45) Date of Patent: Jun. 23, 2009

(54) METHOD OF TRANSMITTING PACKET DATA IN A COMMUNICATION SYSTEM

(75) Inventors: Cheol Woo You, Seoul (KR); Jong Hyae Ahn, Kyonggi-do (KR); Suk Hyon Yoon, Seoul (KR); Young Jo Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1293 days.

(21) Appl. No.: 10/255,323

(22) Filed: Sep. 26, 2002

(65) Prior Publication Data

US 2003/0063620 A1 Apr. 3, 2003

(30) Foreign Application Priority Data

Sep. 29, 2001 (KR) .................. 10-2001-0060964

(51) Int. Cl.
H04B 7/212 (2006.01)
(52) U.S. Cl. .................................... 370/444
(58) Field of Classification Search .......... 370/444, 370/342, 328–329, 348, 349, 335, 474, 392, 370/345, 441, 318, 389, 209, 230, 469, 479, 370/458, 235, 431, 331, 278, 319, 464, 311, 370/252, 347, 337, 395, 341; 455/63.1, 522, 455/454, 524, 456, 434, 515, 561, 562, 424, 455/436, 414, 574, 453, 435, 509, 452, 450; 375/329, 308, 130, 147, 148, 65, 262, 140; 714/723, 746, 755, 774, 779; 725/22; 709/223
See application file for complete search history.

(56) References Cited

U.S. PATENT DOCUMENTS

| | | | | |
|---|---|---|---|---|
| 5,621,723 A * | 4/1997 | Walton et al. | ............. | 370/335 |
| 5,673,259 A | 9/1997 | Quick, Jr. | | |
| 5,790,551 A * | 8/1998 | Chan | ............. | 370/458 |
| 5,910,949 A * | 6/1999 | Bilstrom et al. | ............. | 370/337 |
| 6,005,852 A | 12/1999 | Kokko et al. | | |
| 6,108,542 A * | 8/2000 | Swanchara et al. | ........ | 455/434 |
| 6,141,546 A * | 10/2000 | Thomas et al. | ............. | 455/424 |
| 6,181,683 B1 | 1/2001 | Chevillat et al. | | |
| 6,597,680 B1 * | 7/2003 | Lindskog et al. | ........... | 370/347 |
| 6,597,682 B1 * | 7/2003 | Kari | ........................ | 370/348 |
| 6,747,969 B1 * | 6/2004 | Hirsch | ........................ | 370/342 |

(Continued)

FOREIGN PATENT DOCUMENTS

CN 1221545 6/1999

(Continued)

Primary Examiner—Wing F Chan
Assistant Examiner—Prenell P Jones
(74) Attorney, Agent, or Firm—Lee, Hong, Degerman, Kang & Waimey (57) ABSTRACT

A method of transmitting packet data in a CDM and TDM mobile data communication system is provided. The method comprises determining priorities of one or more control channels, transmitting control information related to one or more packet data sets to one or more mobile stations through corresponding control channels according to the priorities; and transmitting the one or more packet data sets to each mobile station through one or more data channels that correspond to the one or more control channels, respectively. And, a frame duration of the higher priority data control channel restricts a frame duration of the lower priority data control channel.

11 Claims, 7 Drawing Sheets

U.S. PATENT DOCUMENTS

| | | | |
|---|---|---|---|
| 6,775,257 B1 * | 8/2004 | Watanabe | 370/335 |
| 7,126,928 B2 * | 10/2006 | Tiedemann et al. | 370/329 |
| 2001/0006508 A1 | 7/2001 | Pankaj et al. | |
| 2002/0141433 A1 * | 10/2002 | Kwon et al. | 370/441 |
| 2002/0181546 A1 * | 12/2002 | Odenwalder et al. | 375/130 |
| 2003/0039204 A1 * | 2/2003 | Tiedemann, Jr. | 370/209 |
| 2004/0013102 A1 * | 1/2004 | Fong et al. | 370/345 |
| 2004/0013103 A1 * | 1/2004 | Zhang et al. | 370/345 |
| 2006/0007871 A1 * | 1/2006 | Welin | 370/252 |
| 2008/0127240 A1 * | 5/2008 | Covell et al. | 725/22 |

FOREIGN PATENT DOCUMENTS

| | | |
|---|---|---|
| CN | 1199298 | 6/2003 |
| EP | 0 680 168 A2 | 11/1995 |
| EP | 0 877 512 A2 | 11/1998 |
| EP | 0877512 A2 | 11/1998 |
| JP | 11-008879 | 1/1999 |

* cited by examiner

METHOD OF TRANSMITTING PACKET DATA IN A COMMUNICATION SYSTEM

CROSS-REFERENCE TO RELATED APPLICATIONS

Pursuant to 35 U.S.C. § 119(a), this application claims the benefit of earlier filing date and right of priority to the Korean Application No. P2001-60964, filed on Sep. 29, 2001, the content of which is hereby incorporated by reference herein in its entirety.

BACKGROUND OF THE INVENTION

1. Field of the Invention

The invention relates to a mobile communication system, and more particularly, to a method of transmitting packet data in a communication system.

2. Discussion of the Related Art

The existing mobile communication systems often use physical channels such as one or more Packet Data Channels (PDCH) and Packet Data Control Channels (PDCCH) for transmitting packet data. A PDCH is a channel through which one or more packet data sets are transmitted to one or more mobile stations (or users). Each mobile station may share a PDCH with others by using a Time Division Multiplexing (TDM). The PDCCH is a control channel through which one or more control signals are transmitted. A control signal contains control information that enables one or more mobile stations to receive a data packet through a corresponding PDCH.

In current systems, a base station transmits packet data sets to mobile stations by using a TDM. The packet data sets can be transmitted to each mobile station in different time intervals or can be transmitted in a same time interval by using different codes (e.g., Walsh codes) that identifies a packet data set for each mobile station.

The packet data set being transmitted to each mobile station by using a TDM method always uses all the resources available in a PDCH, even if it is not necessary for all the communication resources to be exhausted. Consequently, the system resources are often wasted. In addition, in existing systems that use a TDM method, the period of time for transmitting a packet data set to each mobile station through a PDCH is fixed. Therefore, it is very difficult to use the system resources efficiently. A data communication method is needed that can overcome the above-referenced shortcomings by more efficiently utilizing the transmission resources of the communication system.

SUMMARY OF THE INVENTION

Accordingly, the invention is directed to a method of transmitting packet data in a data communication system and, particularly, to a method of transmitting packet data in a CDM and/or TDM data communication system that promotes the efficient use of the system resources and communication channels.

Additional advantages, objects, and features of the invention will be set forth in the description which follows and, in part, will become apparent to those having ordinary skill in the art upon examination of the following or from practice of the invention. The objectives and other advantages of the invention may be realized and attained by the structure particularly pointed out in the written description and claims hereof as well as the accompanying drawings.

In accordance with one embodiment of invention, a method of transmitting packet data on packet data channel in a radio communication system comprises the steps of prioritizing at least two packet data control channels, transmitting control information related to packet data channel on at least one of the prioritized packet data control channels, and transmitting the packet data on the packet data channels respectively.

According to another embodiment, a method of transmitting packet data on packet data channel in a communication network comprises the steps of scheduling one or more packet data for transmission, deciding whether to use CDM during the scheduling, transmitting control information related to the at least two packet data channels on through at least two packet data control channels having priorities, if the CDM is being used, and transmitting the packet data through packet data channels that correspond to the control channels, during one or more data transmission periods.

According to another embodiment, a method of transmitting packet data control information in a radio communication system comprises the steps of transmitting a first control information to first mobile station on the first packet data control channel having a first priority, and transmitting a second control information to second mobile station on the second packet data channel having a second priority concurrently.

According to another embodiment, a method of transmitting control information in a radio communication system, the method comprises transmitting the control information corresponding to a packet data channel on the at least two control channels using a same time aligned frame duration at a particular time, respectively.

According to another embodiment, a method of receiving a control information on a packet data control channel in radio communication system comprises the steps of receiving a priority information of packet data control channels from a base station, detecting the packet data control channel corresponding to assigned mobile station according to the priority information, receiving control information on the packet data control channel.

According to another embodiment, a method of communicating packet data in a communication network comprises the steps of receiving information from a base station, the information including priorities of at least one control channel, control channel information, and a CDM indicator, the CDM indicator indicating whether CDM is currently being used or not, monitoring the at least one control channel according to the information received from the base station, and receiving a corresponding packet data set by each mobile station by using results obtained from the monitoring.

According to another amendment, a method of transmitting packet data in a radio communication system that uses code division multiplexing (CDM) and/or time division multiplexing (TDM), wherein at least two control channels and at least two data channels are being supported in the radio communication system comprises the steps of prioritizing the at least two control channels in response to predetermined criteria, associating the at least two data channels with the prioritized control channels, informing at least one mobile station of the prioritized control channels, and transmitting the packet data using at least one of the data channels corresponding to the prioritized control channel.

According to another amendment, a method of receiving packet data at a mobile station in a communication network that uses code division multiplexing (CDM) and/or time division multiplexing (TDM), wherein at least two control channels and at least two data channels are being supported in the communication network comprises the steps of receiving prioritized control channel information that prioritized the at least two control channels, associating the at least two data channels with the prioritized control channels, and monitoring the at least two control channels in an order of the prioritized control channels.

According to another embodiment, a radio communication system for transmitting data packets in a communication network that uses code division multiplexing (CDM) and/or time division multiplexing (TDM), wherein at least two control channels and at least two data channels are being supported in the radio communication system comprises means for prioritizing the at least two control channels in response to predetermined criteria, means for associating the at least two data channels with the prioritized control channels, means for informing at least one mobile station about the prioritized control channels, and means for transmitting the packet data using at least one of the data channels corresponding the prioritized control channel.

According to another embodiment, a mobile station for receiving packet data in a communication network that uses code division multiplexing (CDM) and/or time division multiplexing (TDM), wherein at least two control channels and at least two data channels are being supported, the mobile station comprises means for receiving prioritized control channel information that prioritized the at least two control channels, means for associating the at least two data channels with the prioritized control channels, and means for monitoring the at least two control channels in an order of the prioritized control channels.

It is to be understood that both the foregoing summary and the following detailed description of the invention include exemplary embodiments that are intended to provide further explanation of the invention. The content and the embodiments included in the summary and other parts of the application, however, are provided by way of example and should not be construed to limit the scope of the invention as claimed.

BRIEF DESCRIPTION OF THE DRAWINGS

The accompanying drawings, which are included to provide a further understanding of the invention, are incorporated in and constitute a part of this specification.

Features, elements, and aspects of the invention that are referenced by the same numerals in different figures represent the same, equivalent, or similar features, elements, or aspects in accordance with one or more embodiments.

Reference will now be made in detail to one or more embodiments of the invention, examples of which are illustrated in the accompanying drawings.

DETAILED DESCRIPTION OF THE PREFERRED EMBODIMENTS

The present invention is related to a mobile communication system that preferably uses Packet Data Channels (PDCH), Packet Data Control Channels (PDCCH), and Walsh codes for transmitting a packet data set to mobile stations.

A Walsh code space is a set of available Walsh codes that a base station uses when transmitting packet data. Each element of the Walsh code space may vary with time. For example Walsh_Max represents the maximum number of the Walsh codes that can be included in a Walsh code space. This number may vary with time. Walsh_All, for example, represents all the Walsh codes included in a Walsh code space. Although the present invention is described using a Walsh code as an example, the present invention may also be implemented in a system that utilizes other suitable channel coding.

In a case where more than one PDCH is used, PDCH (i) represents the $i^{th}$ PDCH. In some embodiments, the PDCHs divide and use a Walsh code space. For example, if a system uses up to four PDCHs: PDCH (0), PDCH (1), PDCH (2), and PDCH (3), then the PDCHs are scheduled to transmit packet data in the same period by dividing and using a Walsh code space. On the other hand, if the system uses only a single PDCH, the PDCH uses Walsh_All. In addition, if the system uses only two PDCHs, i.e., PDCH (0) and PDCH (1), then both channels share a Walsh code space. Subsequently, the Walsh codes being used by both channels may be defined as Walsh (0) and Walsh (1).

Walsh (i) represents a sub-space included in a Walsh code space, where the subspace includes a set of Walsh codes that PDCH (i) uses at a specified time. Even when the Walsh code space is not changed, Walsh (i) may be changed with time. That is, Walsh (i) may include a different set of Walsh codes during different data transmission periods. This further means that the number of the Walsh codes included in Walsh (i) may vary with time. $N_{max\_PDCH}$ preferably represents the maximum number of PDCHs or PDCCHs that a system is able to use, and $N_{real\_PDCH}$ preferably represents the number of PDCHs or PDCCHs that a system actually uses at a certain time.

Figure 1:
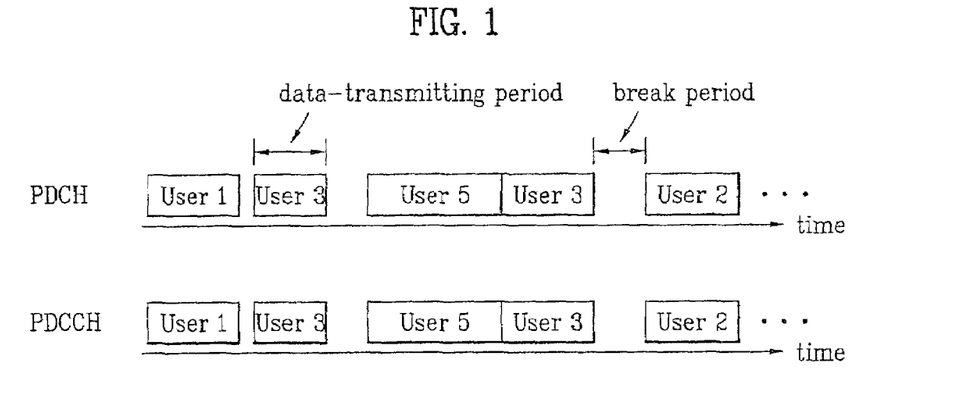
FIG. 1 illustrates an example of the TDM data transmission method.

FIG. 1 illustrates an example of the TDM data transmission method. As shown in FIG. 1, a base station transmits packet data to each user (mobile station) in a predetermined rule by using a Time Division Multiplexing (TDM) method. In this case, the base station uses all the Walsh codes (Walsh_All) included in a Walsh code space.

Referring to FIG. 1, each data transmission period for a user may be fixed or it may change. In addition, the time period for transmitting user data to a user through a PDCH and the time period for transmitting control information to the same user through a PDCCH are not necessarily identical to each other. The time at which base station starts to transmit data and the data transmission period for each transmission are determined according to a predetermined rule. A break period may or may not exist between two consecutive data transmissions, depending on channel environments of the system, for example.

In accordance with one embodiment of the invention in TDM and/or CDM (hereinafter, "TDM/CDM") methods, a base station initially determines an order of transmitting data to each user (scheduling process) and transmits the data in the determined order. The base station may support at least one PDCH. In a case where only one PDCH is used, Walsh_All will be used to transmit the packet data on the PDCH. In other cases where two or more PDCHs are used, the PDCHs will divide and use a Walsh code space. Namely, PDCH (i) uses Walsh (i) in association with PDCCH(i), which is a PDCCH that transmits the control information corresponding to PDCH(i).

Each mobile station (user) is able to find how its corresponding packet data set is being transmitted through PDCH (i) by monitoring PDCCH (i). As mentioned earlier, the period of time for transmitting user data to a user over PDCH (i) and the period of time for transmitting control information to the same user over PDCCH(i) may not be identical to each other.

Figure 2:
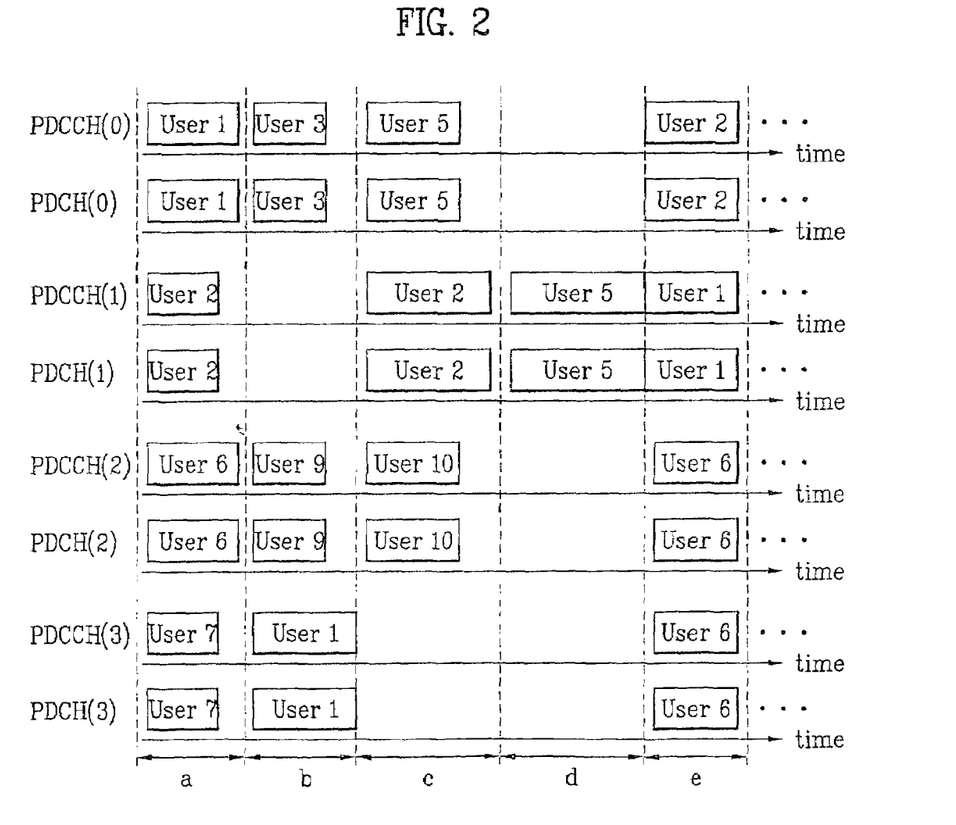
FIG. 2 illustrates an example of the TDM/CDM data transmission method illustrating one-to-one correspondence between the packet data channels and packet data control channels according to an embodiment of the invention.

FIG. 2 illustrates an example of the TDM/CDM data transmission method illustrating one-to-one correspondence between the packet data channels and packet data control channels according to an embodiment of the invention. If a packet data control channel is used for transmitting the control information for the packets, there exists a one-to-one correspondence between the packet data channel and the packet data control channel so that each packet data control channel contains the control information for its associated packet data channel.

Similar to the example shown in FIG. 1, a break period between any two consecutive data transmissions may or may not exist depending on environment status feedback. The empty space shown in FIG. 2 indicates that none of PDCHs and PDCCHs is being used. For example, in interval a, all four PDCHs and PDCCHs are being used. In intervals b and c, three PDCHs and three PDCCHs are being used. In interval d, only one PDCH and one PDCCH are being used. Finally, in interval e, all four PDCHs and PDCCHs are being used.

In the TDM or TDM/CDM data transmission methods, examples of which are shown in FIG. 1 and FIG. 2, a base station sends one or more information to each mobile station as provided below. In one embodiment, for example, a base station sends information related to whether it supports CDM to each mobile station by a physical channel, a signaling channel, or a broadcasting channel. The base station sends this information when it starts to operate or at any time according to its operational condition.

In some embodiments, the base station determines $N_{max\_PDCH}$, the maximum number of PDCHs that can be used and sends it to each mobile station by a physical channel, such as a signaling channel or a broadcasting channel. This maximum number may be preconfigured, for example. Alternatively, the base station may send this information when it starts to operate or at any time according to its operational condition.

In certain embodiments, the constituent information of the Walsh codes being used by one or more PDCHs and/or PDCCHs and the priorities of the PDCCHs may be preconfigured. Here the priority information of PDCCHs may be transmitted to mobile stations on other control channel, signaling channel or broadcasting channel (i.e., ESPM(extended parameter message), ECAM(extended channel assignment message), MC_Parameters message, UHDM (universal handoff direction message)). The priority information may be predetermined by either the terminal or the base station, wherein such information includes the Walsh code information. Preferably, either the mobile station or the base station may set the PDCCH identifier.

In other embodiments, for example, the base station sends the above information to each mobile station. Alternatively, the base station may send the information when it starts to operate or at any time according to its operational condition.

In accordance with one aspect of the invention, the base station may send $N_{real\_PDCH}$, the number of PDCHs currently being used by the system to the mobile stations. Whenever $N_{real\_PDCH}$ changes, the base station may send the changed $N_{real\_PDCH}$ to each mobile station by a physical channel, a signaling channel or a broadcasting channel. The priority of each PDCCH depends on the level of its importance, transmission environment or the data being transmitted via that channel. For the purpose of describing the presenting invention, we will assume that the priority of PDCCH (i) is i.

Depending on implementation, in certain embodiments, channel priority may be determined in accordance with the transmission environment of the user. In a data communications system, error detection and other diagnostic tools may be utilized or embedded in the communications system to determine the efficiency and accuracy levels of data reception and transmission within the system. As such, various transmission environments may be categorized and ranked based on data delivery priority and/or transmission efficiency. Such channel priority information is preferably transmitted to mobile stations.

In one embodiment of the invention, for example, the environment with the worst transmission efficiency is assigned to a first control channel and a first data channel (e.g., PDCCH (0)/PDCH(0)) and the environment with the best transmission efficiency is assigned to the last control channel and the last data channel (e.g., PDCCH(N−1)/PDCH(N−1)). In other embodiments, the most important environment (i.e., the one with the highest priority data), for example, may be assigned to a first control channel and a first data channel (e.g., PDCCH (0)/PDCH(0)) and the least important environment (i.e., the one with the lowest priority data), may be assigned to the last control channel and the last data channel (e.g., PDCCH(N−1)/PDCH(N−1)). The channel assignment may be applied in other way. In accordance with one aspect of the invention, the base station informs each mobile station whether it is transmitting packet data using a CDM method by sending a CDM indicator to each mobile station. This feature may be optional and whether CDM is to be used or not on a certain control channel is determined based on the environment information received from the users and/or the based station communicating on one or more particular data channels.

The base station generates information bits of the CDM indicator and sends the CDM indicator bits to each mobile station. In an embodiment, the CDM indicator comprises a single data bit. For example, if the indicator is set to 1, it means that the base station is currently transmitting packet data using a CDM method. If it is set to zero, for example, it means that the base station is not using the CDM method for transmitting packet data. In other embodiments, a multi-bit CDM indicator may be utilized.

Reference will now be made in detail to methods of transmitting packet data sets to at least one mobile station after at least one of the information described above is provided by the base station.

At time=$t_a$, the base station selects a first packet data set for transmission by performing a first scheduling process. Then it sends corresponding control information on PDCCH (0) and sends the first packet data set on PDCH (0) that uses Walsh (0). If it finds at time=$t_a$ that CDM is not necessary, Walsh (0) may become Walsh_All. In certain embodiments, a code allocation field is included in the control information transmitted via the control channels. For example, in one embodiment, a 5-bit code allocation field is transmitted through PDCCH(0) to indicate the information on Walsh codes used by PDCH(0))

On the other hand, if the base station determines at time=$t_a$ that it does require to use CDM, then it transmits the corresponding control information through control channels (e.g., PDCCH (0), PDCCH (1), etc.), and further transmits the packet data sets through data channels (e.g., PDCH (0), PDCH (1), etc.) corresponding to the control channels, respectively. When all the scheduled packet data sets are transmitted, the base station performs a next scheduling process at time=$t_b$.

If the mobile station does not receive a CDM indicator provided by the base station, then the mobile station determines whether there is a packet data set being transmitted by analyzing the control information of each PDCCH. If the base station does not provide the CDM indicator at all and $N_{max\_PDCH}$ is known, then the mobile station continuously monitors all the PDCCHs according to their priorities or until the assigned PDCCH is found.

If the mobile station receives the CDM indicator provided by the base station and $N_{max\_PDCH}$ is known, then the mobile station continuously checks the CDM indicator. If the CDM indicator indicates that CDM is not currently being used, the mobile station monitors only PDCCH (0). On the other hand, if the CDM indicator indicates otherwise, then the mobile station discovers whether there is a packet data set that it needs to receive by analyzing the control information of each PDCCH, or it continuously monitors all the PDCCHs according to their priorities until all Walsh codes in the Walsh code space or the assigned PDCCH is found.

If the base station does not provide the CDM indicator and $N_{real\_PDCH}$ is known, then the mobile station is able to find that the base station is currently using CDM by using $N_{real\_PDCH}$. For example, if $N_{real\_PDCH}$ is set to "00", it means that CDM is not being used. On the other hand, if $N_{real\_PDCH}$ is set to any other number, it means that CDM is being used.

In the latter case, the mobile station discovers whether there is a packet data set that it needs to receive by analyzing the control information of each PDCCH, or it continuously monitors all the PDCCHs according to their priorities until it finds all Walsh codes in Walsh code space or the assigned PDCCH. For example, if $N_{real\_PDCH}$ is set to "00", the mobile station monitors only PDCCH (0). If, for example, $N_{real\_PDCH}$ is set to "01", then the mobile station monitors PDCCH (0) and PDCCH (1). If $N_{real\_PDCH}$ is set to "10", then the mobile station monitors PDCCH (0), PDCCH (1), and PDCCH (2), for example. And, if $N_{real\_PDCH}$ is set to "11", then the mobile station monitors all the PDCCHs, for example. Depending on implementation $N_{real\_PDCH}$ may be set to other bit values. The bit sets provided herein are by way of example only and should not be construed to limit the scope of the invention as claimed.

In each case discussed above, if the mobile station does not know a data transmission period of PDDCH or PDCH (for example, each data transmission period of PDCH (i) is not included in the control information of PDCCH (i)), each mobile station may find it by using any additional methods including checking CRC of PDCCH (i). As such, a data transmission period may be blindly calculated.

Figure 3:
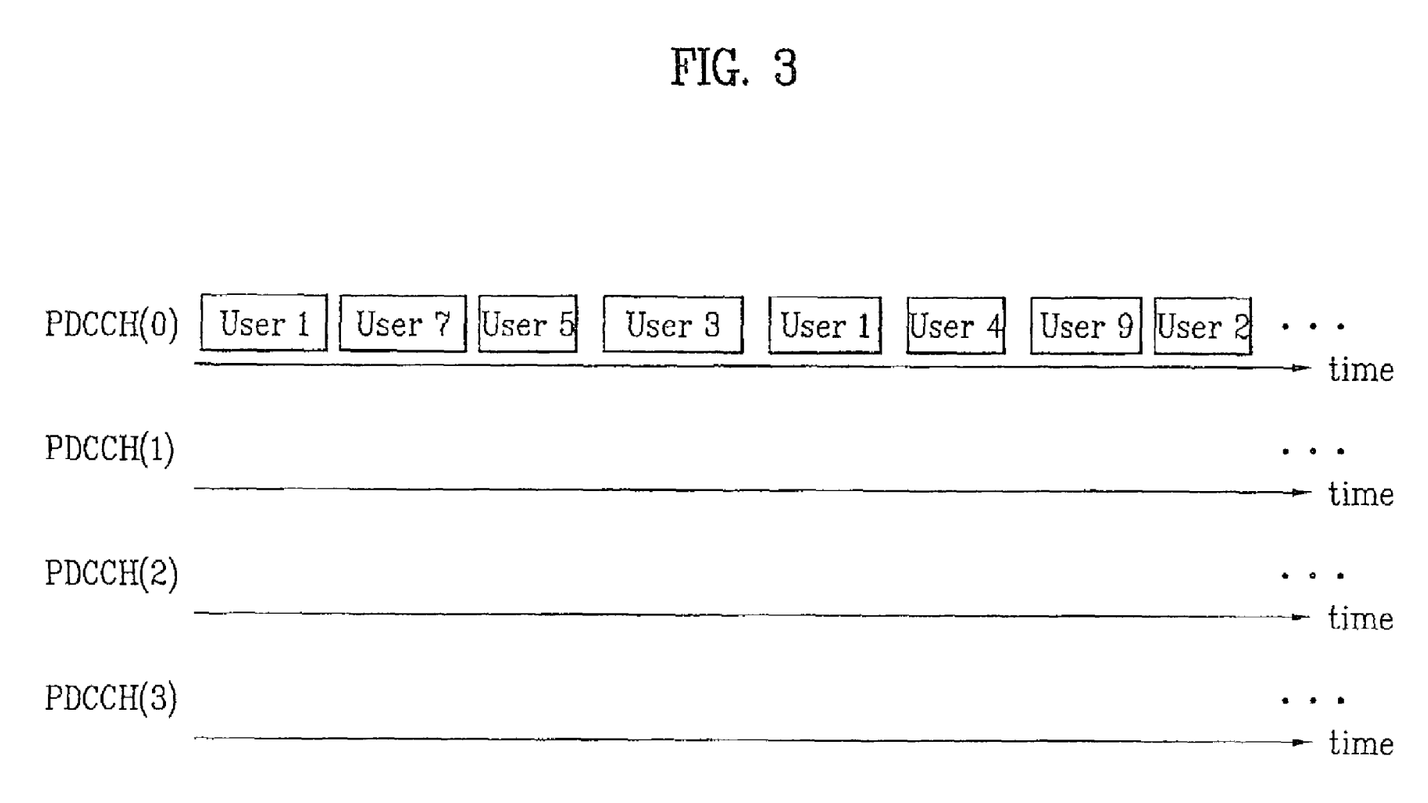
FIG. 3 illustrates another example of the TDM/CDM data transmission method according to one embodiment of the invention.

FIG. 3 illustrates another example of the TDM/CDM data transmission method according to one embodiment of the invention. As shown, in one embodiment the base station does not use CDM at all, and all the control information are transmitted through PDCCH (0).

Figure 4A:
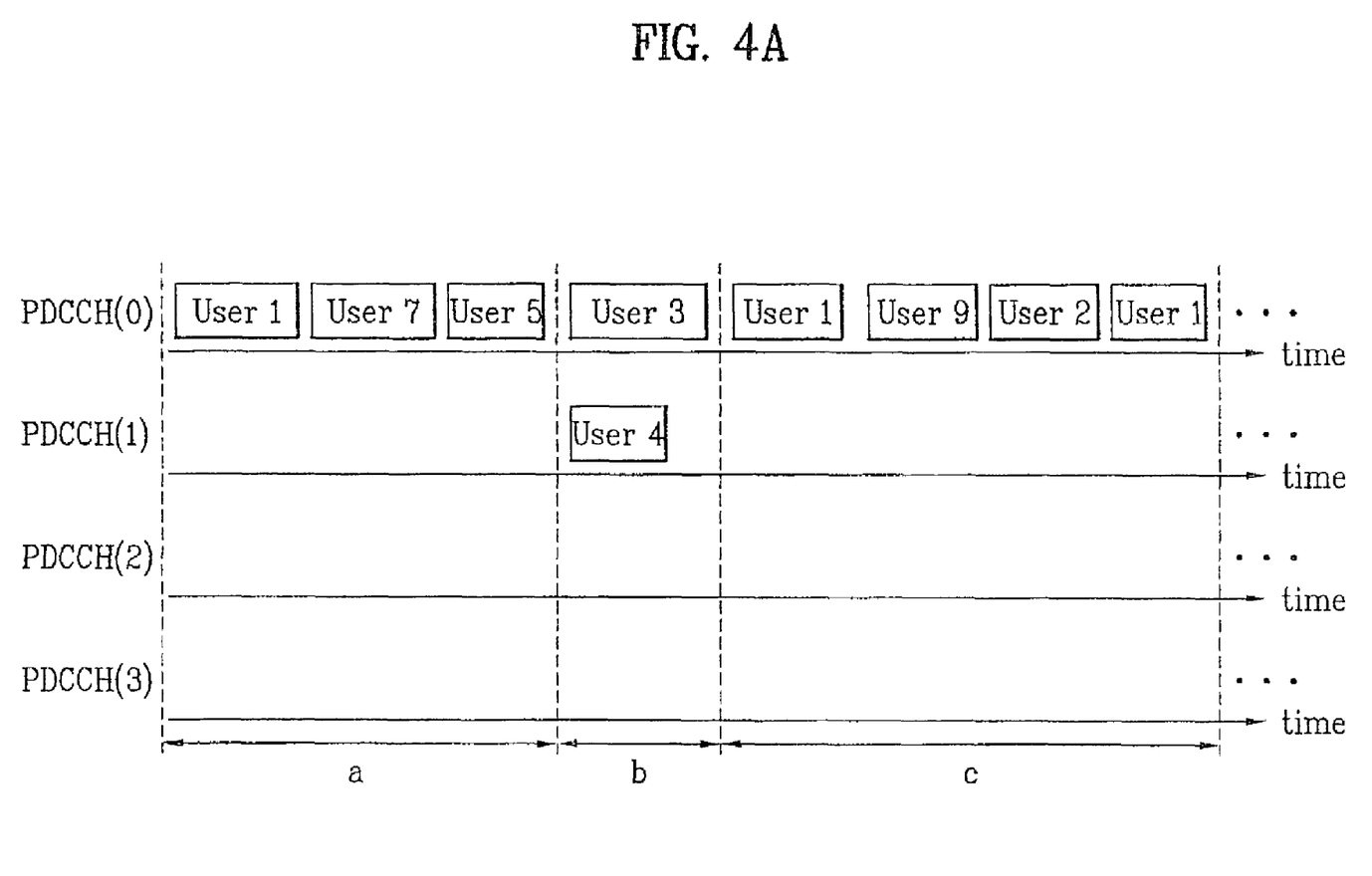
FIGS. 4A and 4B illustrate further examples of the TDM/CDM data transmission method according to one embodiment of the invention.
Figure 4B:
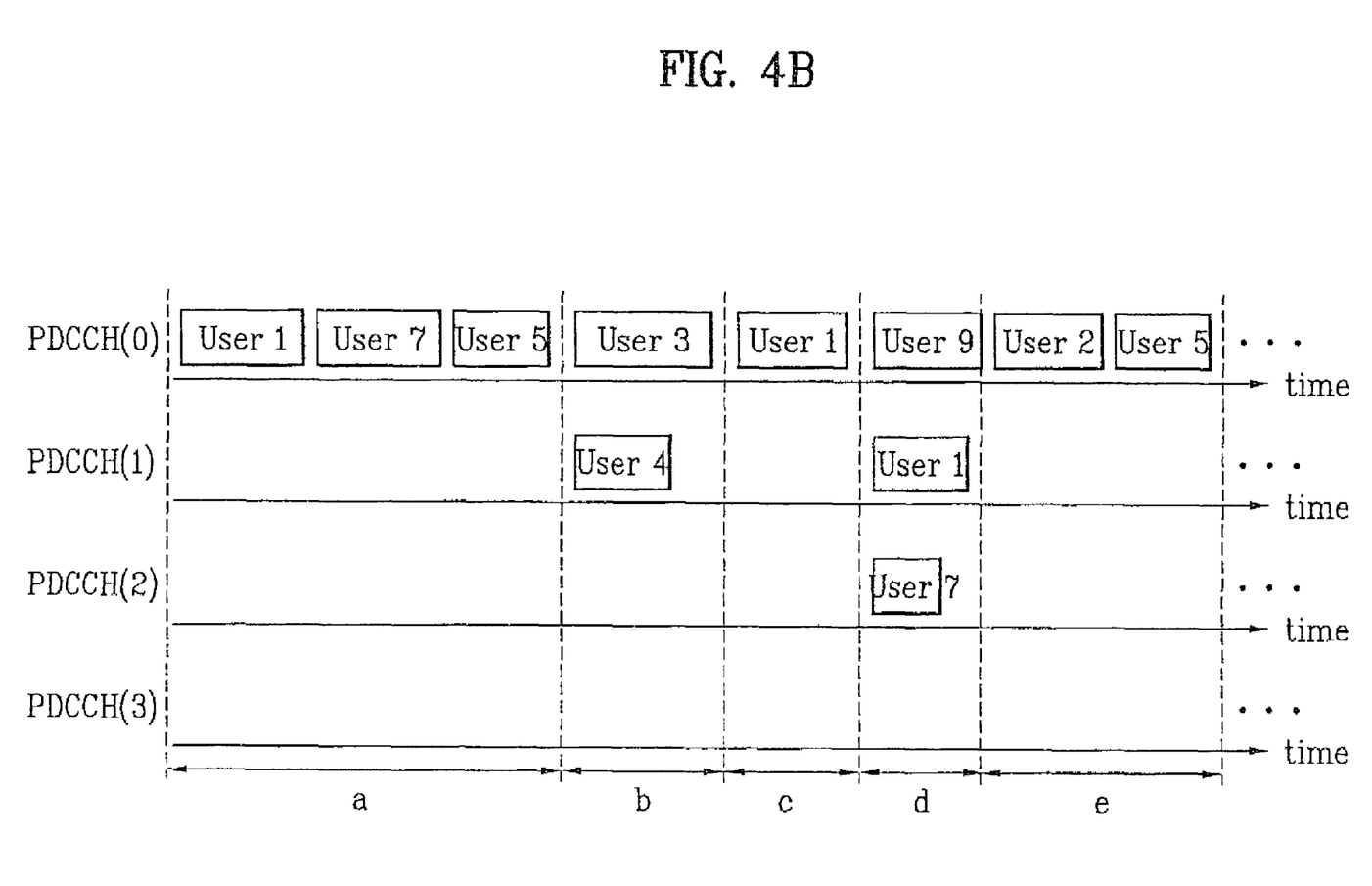

FIGS. 4A and 4B illustrate other examples of the CDM/TDM data transmission method according to one or more embodiments of the invention. In each interval that CDM is used, the control information sets are transmitted on one or more PDCCHs in the order of their priority. In both figures, it is assumed that $N_{max\_PDCH}$=4. According to the preferred embodiment, during the CDM transmission, the transmission intervals (for example, shown as intervals or frame durations a, b, c in FIGS. 4A and 4B) of the PDCCH (0) may be arbitrarily set. However, any lower priority channels, for example, PDCCH (1). (3), preferably use the same transmission intervals as the channel having the highest priority, namely, PDCCH (0). In other words, if two or more data control channels are being used at a particular time, such PDCH and/or PDCCH channels use the same time-aligned frame duration.

Referring to FIG. 4A, in intervals "a" and "c", PDCCH (0) uses Walsh_All because only TDM is being used. However, in interval "b", PDCCH (i) uses Walsh (i) because only CDM is being used. $N_{real\_PDCH}$ at interval b is 2, because there are 2 scheduled Users 3 and 4 in that interval. In order words, if CDM is used and there are two PDCCH, the PDCCHs must be used in the predetermined priority described above (for example, PDCCH (0), PDCCH (1)).

Referring to FIG. 4B, in intervals a, c, and e, PDCCH (0) uses Walsh_All because only TDM is used. However, in intervals b and d, PDCCH (i) uses Walsh (i) because CDM is used. The values of $N_{real\_PDCH}$ in intervals b and d are 2 and 3, respectively. In other words, if CDM is used and there are three PDCCH, the PDCCHs must used in the predetermined priority (for example, PDCCH (0), PDCCH (1), PDCCH(2)).

Figure 5A:
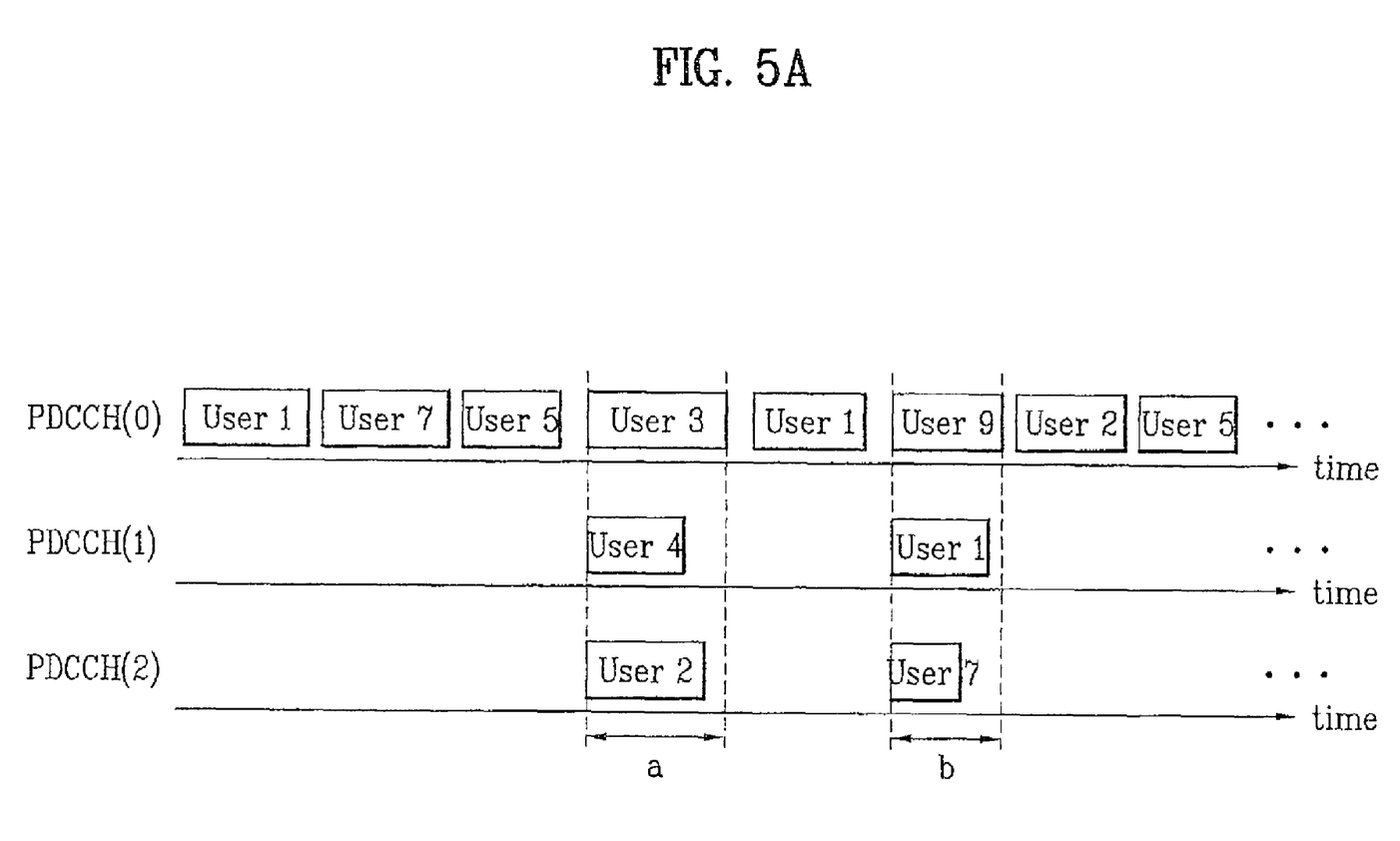
FIGS. 5A through 5C illustrate further examples of the TDM/CDM data transmission method according to one or more embodiment of the invention.
Figure 5B:
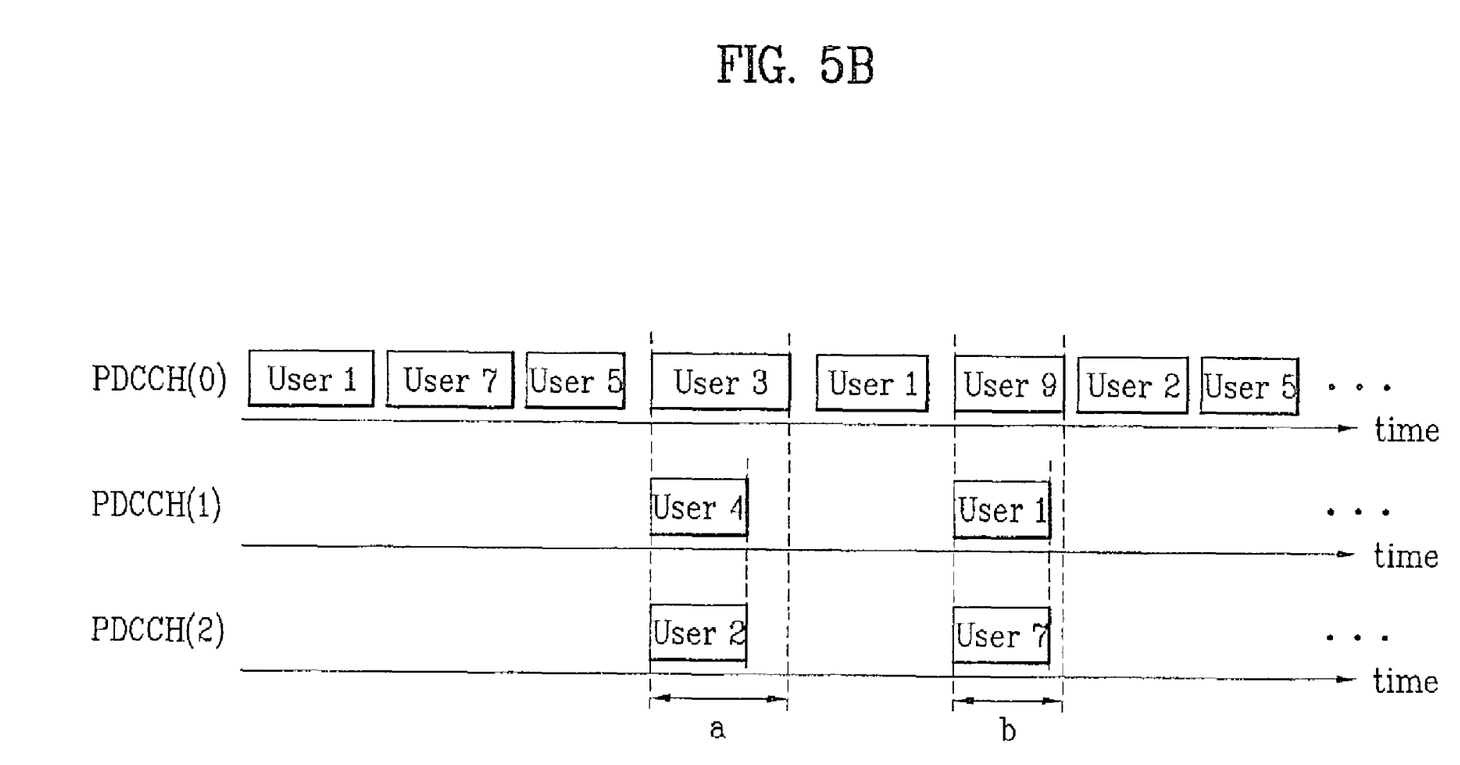
Figure 5C:
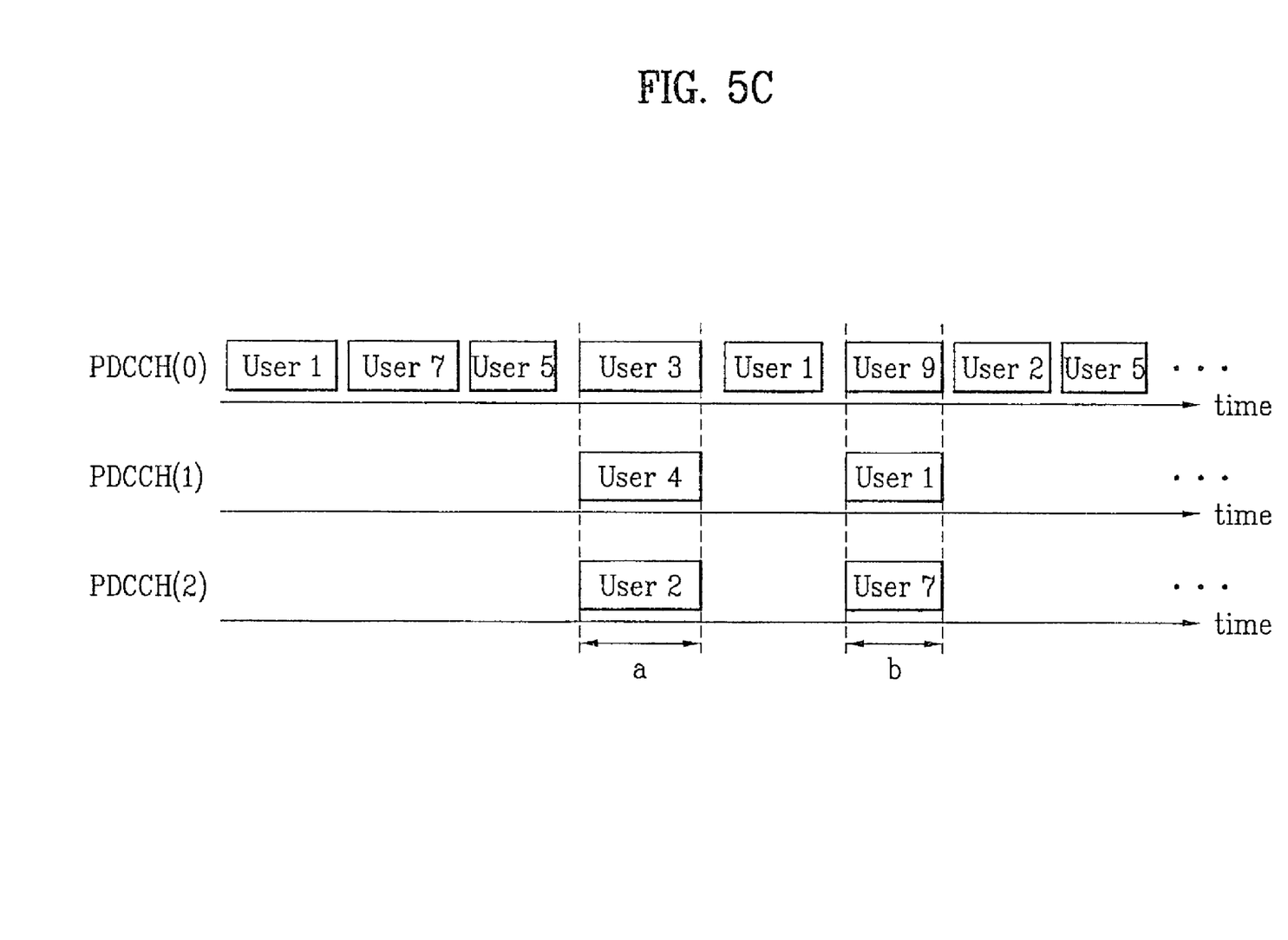

FIGS. 5A through 5C illustrate further examples of the CDM/TDM data transmission method according to the invention, in which the length of the data transmission period for PDCCH (i) is restricted. Referring to FIG. 5A, in interval a, the lengths of the data transmission periods for PDCCH (1) and PDCCH (2) are shorter than that of PDCCH (0). Referring to FIG. 5B, in interval a, the lengths of the data transmission periods of PDCCH (1) and PDCCH (2) are shorter than that of PDCCH (0), and they are identical to each other. Referring to FIG. 5C, in interval a, the lengths of the data transmission periods of PDCCH (1) and PDCCH (2) are identical to that of PDCCH (0). In other words, a frame duration of the higher priority data control channel restricts a frame of the lower priority data control frame. If two or more data control channels are being used at a particular time, such data control channels use the same time-aligned frame duration and the beginning of the data control channel is aligned with the beginning of the corresponding data channel. Because the data channels correspond to the data control channels, the data channel is applied as described above. Preferably, all packet data control channels and packet data channels begin their transmissions at the same time and have the same durations.

As such, a data communication method that reduces the wasteful use of the available system resources using a combination of CDM and TDM data transmission methods is provided. The provided method further prevents the over saturation of data control channels in a communication system that only uses one data transmission channel.

As alternative embodiments, the present invention may be implemented by using New Packet Data Control Channels (NPDCCH), which are additional control channels that transmit additional control information.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a processor readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the present invention, and that the article of manufacture may comprise any information bearing medium known in the art.

Although particular embodiments of the invention have been shown and described, it will be apparent to those skilled in the art that changes and modifications may be made without departing from the invention in its broader aspects, and therefore, the appended claims are to encompass within their scope all such changes and modifications that fall within the true scope of the invention.

What is claimed is:

1. A method of communicating packet data in a communication network, the method comprising the steps of:
   receiving information from a base station, the information including priorities of at least one control channel, control channel information, and a CDM indicator, the CDM indicator indicating whether CDM is currently being used or not;
   monitoring the at least one control channel according to the information received from the base station; and
   receiving a corresponding packet data set by each mobile station by using results obtained from the monitoring.

2. The method of claim 1, wherein the control channel information includes a maximum number of control channels and a number of control channels currently being used.

3. The method of claim 2, wherein each mobile station monitors the control channels according the maximum number of control channels, if the CDM indicator is not received and the maximum number of control channels is known.

4. The method of claim 1, wherein each mobile station monitors the control channels according to the CDM indicator, if the CDM indicator is received.

5. A method of transmitting packet data and control information between a base station and a mobile station in a radio communication system, the method comprising:
   transmitting first control information on a first packet data control channel; and
   transmitting second control information on a second packet data control channel, the first control information associated with a first packet data channel and the second control information associated with a second packet data channel;
   wherein the first and second packet data control channels are monitored by a mobile station in a predetermined order based on whether code division multiplexing (CDM) is used;
   wherein, if both the first and second control information is to be used, the first and second packet data control channels are to be decoded in a predetermined order such that the first control information is used before the second control information.

6. The method of claim 5, wherein the predetermined order is based on a number of packet data control channels being used.

7. The method of claim 5, further comprising transmitting additional information to at least one mobile station prior to transmitting packet data and transmitting the first and second control information, the additional information comprising at least one of information indicating whether CDM is supported, information indicating a maximum number of packet data channels, and information indicating whether CDM is currently being used.

8. The method of claim 5, further comprising transmitting Walsh code information to at least one mobile station, the Walsh code information corresponding to at least one of the first and second packet data control channels.

9. The method of claim 5, further comprising:
   scheduling packet data for transmission on at least one packet data channel; and
   transmitting the packet data through at least one packet data channel during at least one data transmission period.

10. The method of claim 5, further comprising transmitting information to indicate a maximum number of packet data control channels or a maximum number of packet data channels being supported.

11. The method of claim 5, wherein the first packet data channel and the first packet data control channel have a one-to-one correspondence and the second packet data channel and the second packet data control channel have a one-to-one correspondence such that each packet data control channel contains the control information for its associated packet data channel.

* * * * *